July 18, 1939.  J. TJAARDA  2,166,774
FRONT WHEEL SUSPENSION
Original Filed April 4, 1936  4 Sheets-Sheet 1

INVENTOR.
John Tjaarda
BY
Pike, Calver & Gray.
ATTORNEYS.

July 18, 1939. J. TJAARDA 2,166,774
FRONT WHEEL SUSPENSION
Original Filed April 4, 1936 4 Sheets-Sheet 2
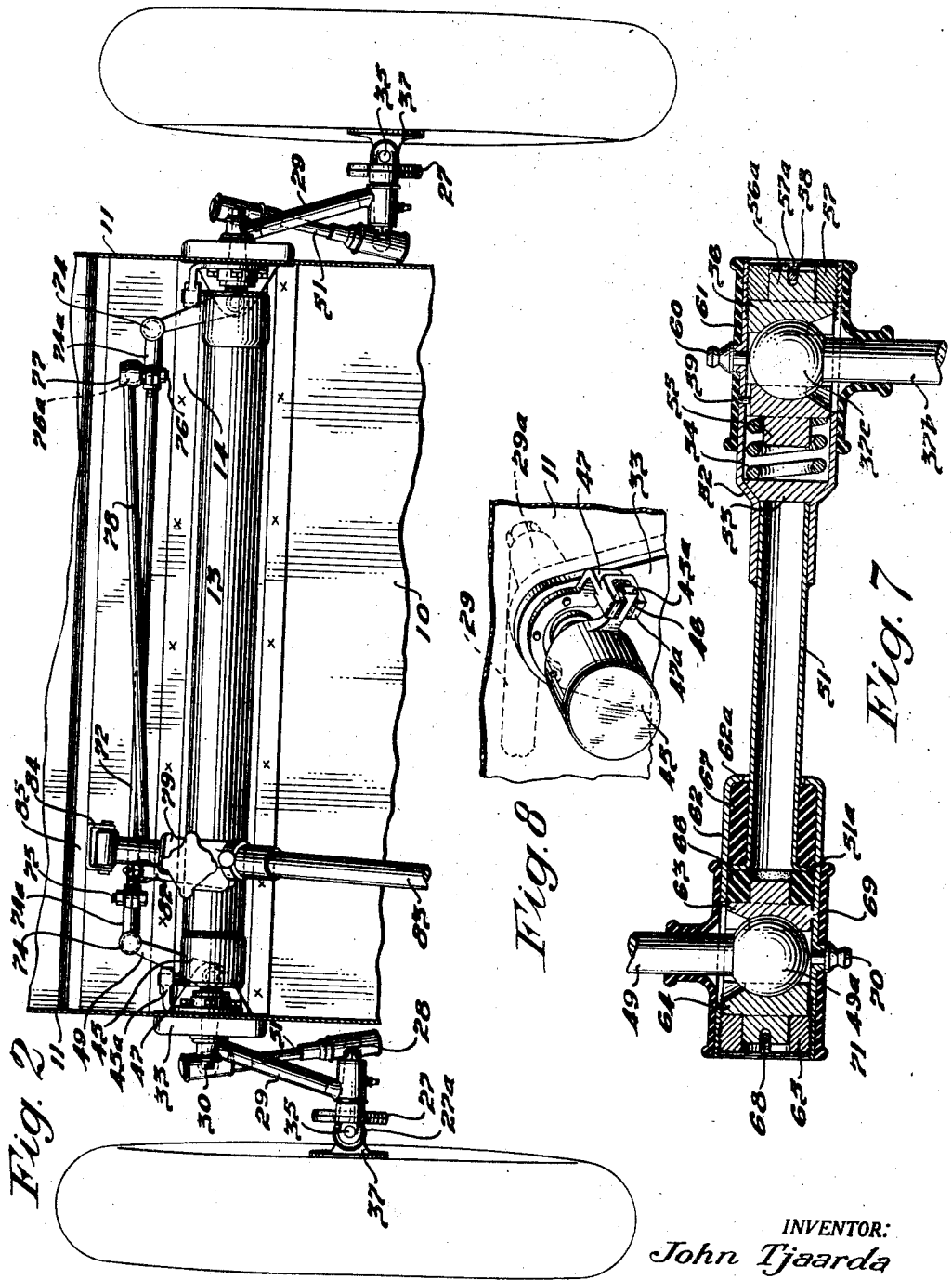
INVENTOR:
John Tjaarda
BY
Pike, Calver & Gray
ATTORNEYS

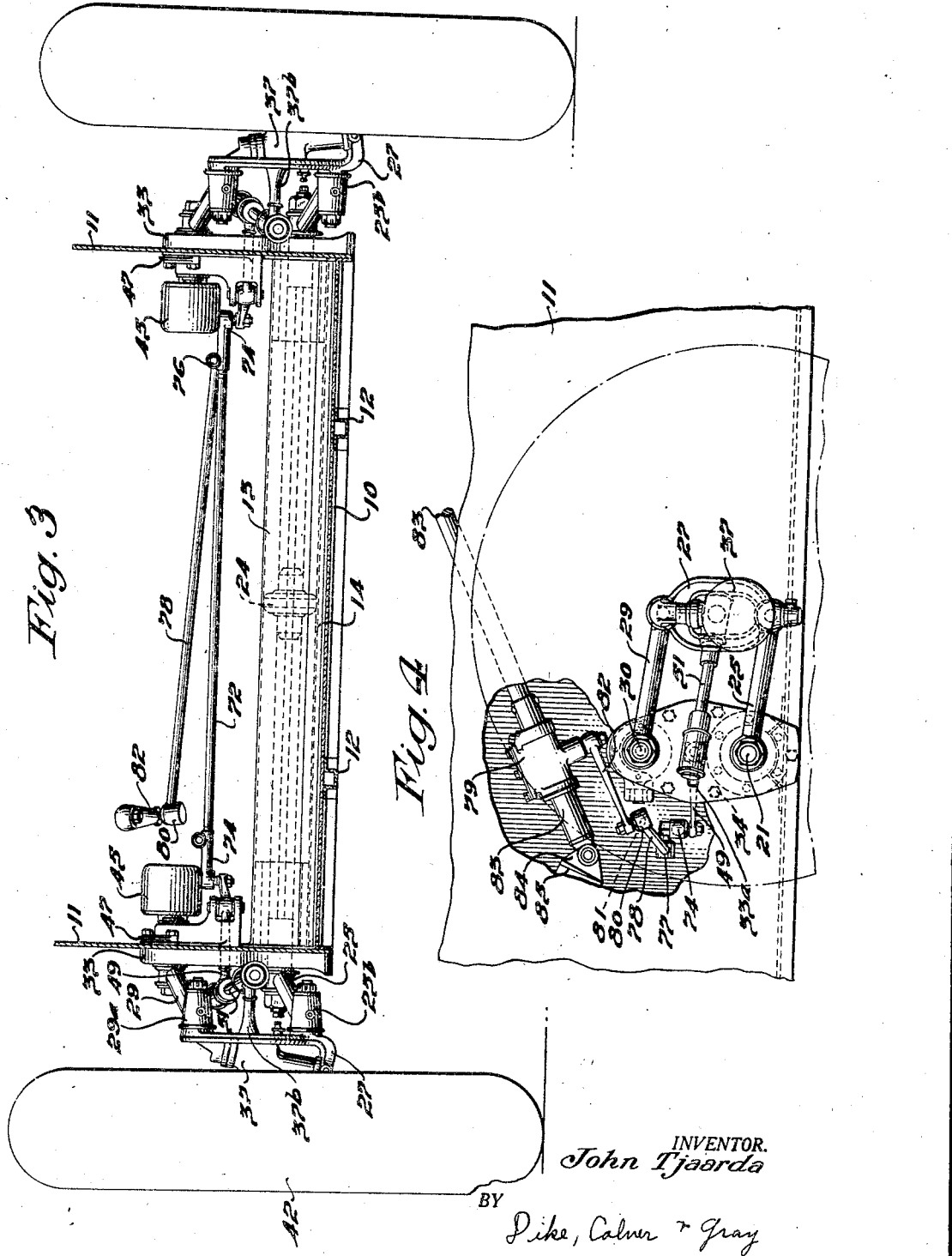

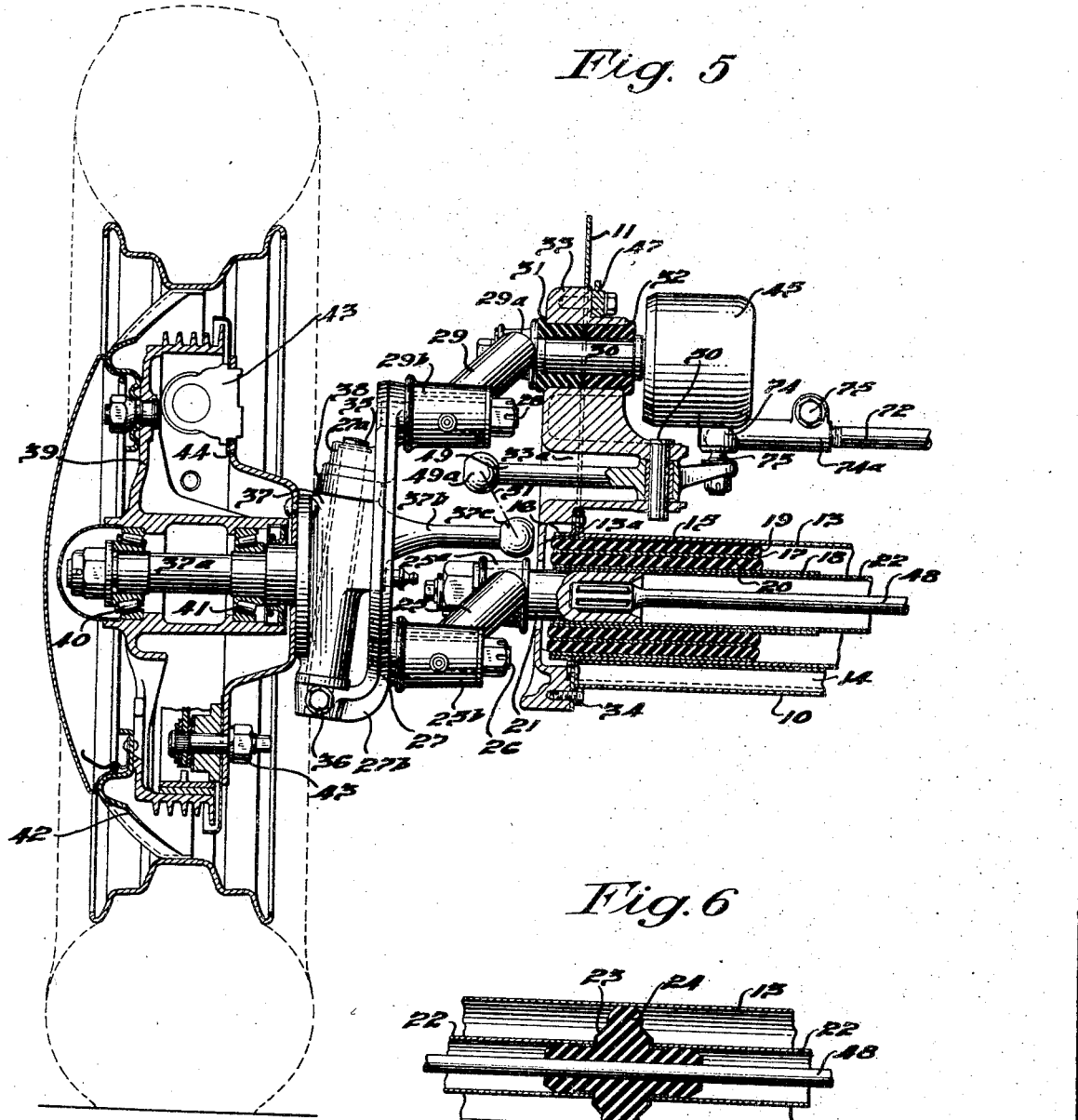

Patented July 18, 1939

2,166,774

UNITED STATES PATENT OFFICE 2,166,774

FRONT WHEEL SUSPENSION

John Tjaarda, Birmingham, Mich., assignor to Briggs Manufacturing Company, Detroit, Mich., a corporation of Michigan Application April 4, 1936, Serial No. 72,722
Renewed June 2, 1939

13 Claims. (Cl. 280—124)

This invention relates to independent suspensions for the front wheels of automobiles and one of its important objects is to provide a suspension of this type in which there is no path from the wheels to the body or frame of the car uninterrupted by sound deadening material, so that the transmission of tire noise and "road rumble" to the body is effectively prevented.

Another object of this invention is to provide a suspension in which the resiliency of the suspension is provided by rubber subjected to shearing stresses.

Another object of this invention is to provide an independent front suspension having the minimum number of non-resilient pivots but yet guiding the wheel relative to the frame or body of the car without permitting appreciable variation in the track, caster, camber, or toe-in.

Another object of this invention is to provide an independent front suspension incorporating a so-called "sway-bar" and having a minimum number of pivots.

Another object of this invention is to provide an independent suspension adapted to be readily built into an automobile having a monocoque or semi-monocoque body and not having a separate frame.

Another object of this invention is to provide a suspension having a large number of parts outside of the body of the car which are in metal to metal contact with each other and which are insulated from the body so that they can be used as a radio aerial or ground.

Other objects of this invention will appear in the following description and appended claims, reference being had to the accompanying drawings forming a part of this specification wherein like reference characters designate corresponding parts in the several views.

Fig. 2 is a plan view of the suspension and the part of the body to which it is fastened, the rest of the body and the upper part of the steering column being broken away.

Fig. 3 is a rear elevation of the parts shown in Fig. 2 as they would be seen in looking from the bottom of the figure, the steering column and gear being omitted.

Fig. 4 is a side view of the parts shown in Figs. 2 and 3 as they would be seen in looking from the left side of those figures, the wheel and other parts carried by the steering knuckle being omitted and part of the body being broken away to show the parts that would be otherwise hidden.

Fig. 5 is an enlarged rear view of the left side of the suspension, or an enlargement of the left side of Fig. 3, with many of the parts shown in section and with the drag link omitted.

Fig. 6 is an enlargement of the central part of Fig. 3 with the parts shown in section.

Fig. 7 is a sectional view of one of the short longitudinal drag links, taken on a horizontal plane.

Fig. 8 is a perspective view of the left shock absorber and its mounting, shown as it would appear to a person standing in front of the car and looking down and back at the shock absorber.

Figure 1:
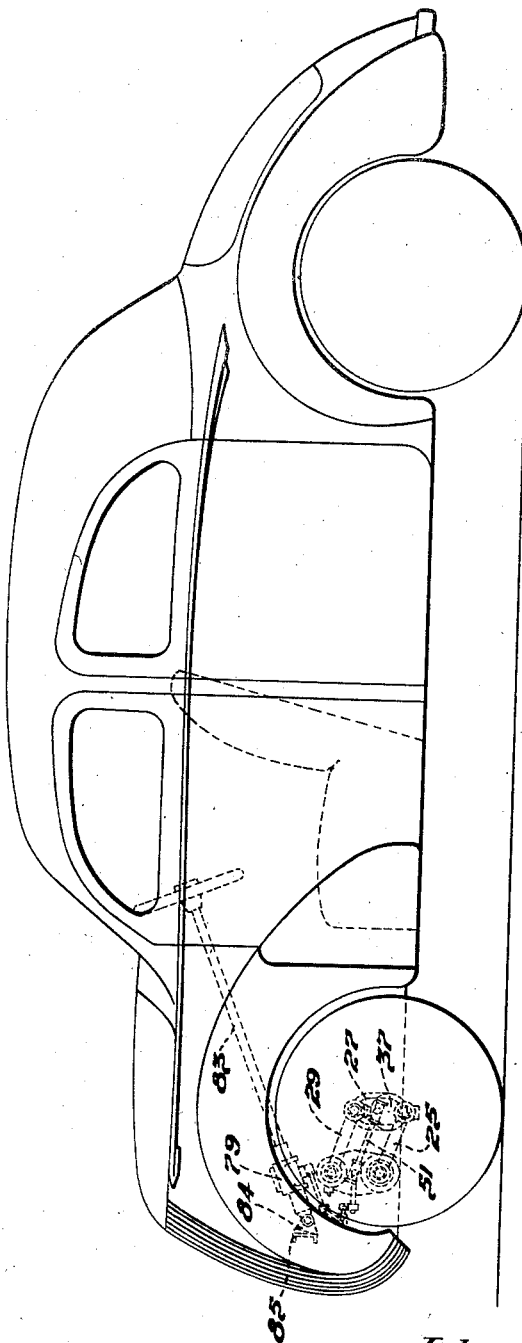
Fig. 1 is a side elevation of a car embodying a preferred form of the invention, the position of the suspension in the car being shown in dotted lines.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

A preferred embodiment of the invention, illustrated in the drawings by way of example, is shown incorporated in a rear engine car having a body of monocoque or semi-monocoque construction and having no separate frame. The structural members in the forward part of the body comprise a floor pan 10 extending between and welded to the lower edges of a pair of vertical side panels 11, a pair of longitudinal stringers 12 extending under and reenforcing the floor 10, and a large transverse horizontal tube 13 extending from side to side just above the floor 10 of the car. The ends of the tube 13 register with apertures in the sides 11, flanges 13a on the tube fitting against and being riveted or otherwise secured to the sides 11 of the car. The tube 13 is also secured to the floor 10 by a sheet metal saddle 14 extending across the car between the tube 13 and the floor 10 and welded to both. The tube 13 is thus rigidly secured in the car, and it forms one of the principal members through which the weight of the car is transmitted to the suspension.

In each end of the tube 13 there is inserted a cylindrical sleeve 15 (Fig. 5) having a circular flanged ring 16 welded to its outer end. The flange of the ring 16 fits against the outer surface of the side 11 of the car and is fastened to it by the same rivets that secure to it the flanged end 13a of the large transverse tube 13. Mounted within and concentric with the sleeve 15 are two progressively smaller sleeves 17 and 18, the three sleeves being separated from each other by two large resilient rubber bushings 19 and 20 bonded, as by vulcanizing, to the sleeves.

A stub shaft 21 is mounted within the inner sleeve 18 and is welded within the end of a tube 22 which extends through the sleeve 18 and through the large transverse tube 13 to the center line of the car. The inner end of the tube 22 is mounted on a metal sleeve 23 on one end of the hub of a disc-like rubber bearing 24 located in the center of the tube 13. The small tube 22 and the stub shaft 21 welded within its end are thus resiliently supported at two widely separated points, preventing any appreciable movement except rotation. The rotation is controlled by the rubber bushings 19 and 20 because the end of the sleeve 18 surrounding the tube 22 extends in away from the rubber bushings 19 and 20 towards the center of the car and is welded to the tube 22. Thus, rotation of the stub shaft 21 secured to the tube 22 is resiliently resisted by the rotation of the inner layers of the rubber bushings 19 and 20 with respect to the outer layers.

Referring to Fig. 5, an arm 25 has one end 25a keyed or splined to the outer end of the stub shaft 21 and extends back a short distance along the side of the car. The other end of the arm 25 is formed into a sleeve or bearing 25b for a short spindle 26 riveted into the lower part of a steering head 27 and parallel to the stub shaft 21. The upper part of the steering head or bracket 27 also has a similar short spindle 28 riveted to it on which is pivoted the posterior end 29b of an upper arm 29 which lies above and is parallel to the lower arm 25. The other end 29a of the arm is keyed or splined onto the outer end of a shock absorber shaft 30 rotatably supported by a pair of rubber bushings 31 and 32 mounted in the upper part of a supporting member 33. The supporting member 33 is secured to the side of the body by a plurality of bolts 34, so that the axis of the shock absorber shaft is fixed relative to the car. Thus the upper and lower arms 29 and 25, the steering head 27 and a portion of the body form a parallelogram linkage, the two arms being parallel and of equal length and the four pivots 18, 26, 28 and 30 being parallel and horizontal. The linkage guides the steering head 27 in a slightly curved path lying in a vertical plane parallel to the axis of the car and keeps it parallel to its original position. This ensures that the caster, camber and toe-in of a wheel carried on the steering head will remain constant irrespective of the vertical movement of the wheel.

The outer face of the steering head 27 carries a pair of vertically spaced integral brackets 27a and 27b which carry a king pin 35 placed at the correct small angle to the vertical and is retained and prevented from rotating by a bolt 36 through the lower bracket 27b. A steering knuckle 37 and a front wheel spindle 37a forged integrally with it are mounted on the king pin 35, the steering knuckle being provided with a bronze bushing and a thrust type ball bearing 38 being placed between the steering knuckle 37 and the upper bracket 27a on the steering head.

A combined hub, wheel center and brake drum 39 is mounted on the wheel spindle 37a by suitable anti-friction bearings 40 and 41 and carries a pressed steel wheel 42. Within the brake drum is mounted a conventional hydraulic braking mechanism 43 carried on a brake backing plate 44 riveted to a flange on the steering knuckle 37. When the brake is applied, the braking torque is transmitted from the brake backing plate 44 through the steering knuckle 37a, the king pin 35 and the steering head 27 to the upper and lower arms 29 and 26, which receive it as thrust in one arm and tension in the other and transmit it to the body.

The lower arm or load arm 25 supports the weight of the car carried by the wheel 42 and the resilient anchorage of its shaft 21 in the rubber load carrying bushings 19 and 20 provides the resiliency necessary to allow the wheel 42 to rise and fall with respect to the car in answer to irregularities in the road. The rubber bushings 19 and 20 thus perform the function performed by springs in most suspensions and for this reason are made quite large. Since they are not only subject to the torque transmitted to the shaft 21 but also to the vertically acting weight of the car, two thin bushings bonded to the intermediate sleeve 17 are provided instead of one thick bushing, because in thick bushings there is a greater tendency than in thin bushings for the rubber to squeeze around the bushing from the loaded to the unloaded side.

The upper or shock absorber arm 29 transmits to a shock absorber 45 the forces accompanying vertical movement of the wheel 42. The shock absorber 45, whose interior is the same as in the conventional hydraulic type, is rotatably mounted on the inner end of the shaft 30 to which the arm 29 is secured. The body of the shock absorber 45 (as shown in Fig. 8) is provided with a short radial arm 45a whose movement with respect to the body of the car is resiliently restrained by a rubber pad 46 extending around it and carried in the forked end 47a of a bracket 47 bolted to the shock absorber shaft supporting member 33. The resiliency of the rubber pad 46 allows the shock absorber 45 to rotate slightly in either direction with its shaft without transmitting an appreciable force to the body. This allows the wheel 42 to follow freely small irregularities in the road without their being transmitted to the body of the car but brings the shock absorber into effect for the larger movements of the wheel, when its action is needed.

The suspension is independent in the ordinary sense of the word, that is, vertical movement of one wheel above or below its normal position is not accompanied by a change in the inclination of the other wheel. This ensures that there will be no tendency to "shimmy". The two wheels are not fully independent, because their suspensions are interconnected by a torsion bar 48 extending across the car within the two alined tubes 22 into whose outer ends the two stub shafts 21 carrying the two wheels 42 on the two sides of the car are welded. The center of the torsion bar 48 is supported by the rubber bearing 24 in the center of the large transverse tube 13, the rubber bearing dampening any vibration of the bar, and its ends are enlarged and splined to fit into splined sockets in the inner ends of the load carrying stub shafts 21. Thus, whenever the two stub shafts 21 rotate relative to each other, the torsion bar 48 is twisted and resiliently opposes such rotation. This takes place whenever the wheel on one side moves up or down relative to the wheel on the other side, as when the car leans over on a curve. The result is that the suspension is made much stiffer against side sway without affecting the softness of action in response to vertical forces acting simultaneously on both wheels.

The two steering heads 27 associated with the two wheels 42, are oval and are provided with large central apertures through which project steering arms 37b forged integrally with the steering knuckles 37 and terminating in spherical ends 37c. Two steering levers 49 are carried on pivots 50 at the bottom of horizontal sockets 33a in the members 33, which carry the shock absorber shafts 30. The steering levers 49 project out from the two sides of the car and terminate in spherical ends 49a.

The spherical ends 37c and 49a of the steering arms 49 and 37b on each side of the car are connected together by a short drag link 51 lying between the longitudinal levers or arms 25 and 29 which carry the steering head 27 (Figs. 5 and 7). At each end of the drag link 51, the balls 37c and 49a upon which the drag link is pivoted lie in the same vertical planes as and halfway between the pivots 26, 28, 21 and 30 and the ends of the arms 25 and 29, when the wheels are directed straight ahead. This arrangement of the linkage ensures that, with the steering levers stationary and the wheels directed straight ahead, absolutely no turning of the wheels will be caused by their movement vertically with respect to the car, and only an infinitesimally small turning when they are directed to the side.

Each drag link 51, as shown in Fig. 7, is provided at both ends with sealed sockets to receive the spherical ends 37c and 49a of the steering arm 37a and steering lever 49. The socket for the steering arm ball 37c comprises a short tube 52 necked down and welded to the drag link. Slidably mounted one after another in the tube 52 are a spring seat 53 resting against the interior of the neck of the tube 52 and against the end of the drag link shaft 51, a helical spring 54, and a pair of ball seats or socket members 55 and 56. The ball 37c on the steering arm 37b lies between the ball seats 55 and 56, and the steering arm 37b passes through a hole in the side of the tube 52. The ball seats 55 and 56 and the ball 37c between them are held together and in place against the pressure of the spring 54 by a hollow plug 57 screwed into the tapped end of the tube 52. The ball seat 56 between the ball 37c and the screw plug 57 is provided with a slotted stem 56a, which projects into the center of the plug 57, and a single cotter pin 58 passing through the wall 52 of the socket, through a slot 57a in the plug, and through the slot in the stem 56a of the ball seat prevents both the plug 57 and the ball seat 56 from turning. The other ball socket member 55 is prevented from turning by a pin 59 fixed in the wall of the tube 52 and projecting into a slot in the side of the ball socket member. The joint is greased through a conventional grease fitting 60 set in the wall of the tube 52 and the grease is retained and dirt is excluded by a grease-resisting rubber boot or jacket 61 which encloses the joint and fits tightly around the steering arm 37b.

The sockets at the front ends of the drag links 51 are generally similar to those at the rear ends, each comprising a tube 62 containing a pair of socket members 63 and 64 held in place and against the ball 49a on the end of the steering lever 49 by a hollow plug 65 screwed into the end of the tube 62. The drag link shaft 51 is not welded to the tube 62 however, but projects within it and terminates in a flange 51a which lies between two annular rubber blocks or bushings 66 and 67. The rubber blocks lie between the socket member 63 and the flanged inner end 62a of the tube 62 and resiliently hold one socket member 63 and the ball 49a against the other socket member 64. They thus perform the same function as the spring 54 in the socket at the other end of the drag link. In addition they serve to insulate the drag link 51 from the steering lever 49 preventing the transmission of sound up through the steering gear and helping to damp out road shocks. The pressure with which the rubber blocks press the ball seats 63 and 64 against the ball 49a can be adjusted by the screw plug 65. The screw plug and the two ball socket members are prevented from turning by a cotter pin 68 and a pin 69 in the wall 62 of the socket similar to the cotter pin 58 and the pin 59 at the other end of the drag link. A grease nipple 70 is provided in the wall of the tube 62 for lubricating the joint, and the grease is retained and dirt excluded by a rubber jacket 71.

The two steering levers 49 extend forward from their pivots 50 and are connected together by a tie rod 72, the ends of the tie rod 72 being connected to the levers 49 by balls 73 bolted to the levers 47 and fitting into sockets 74. The sockets 74 are provided with split tubular arms 74a into which the ends of the tie rod 72 are threaded with right and left hand threads at the two ends to provide a micrometer adjustment. Bolts 75 and 76 are provided to clamp the split tubular arms onto the ends of the tie rod 72 to retain the adjustment.

One of the clamping bolts 76 carries a ball 76a which is enclosed in socket 77 on the end of a transverse drag link 78. The other end of the transverse drag link 78 is connected to the steering gear 79 by a socket 80 which encloses a ball 81 bolted onto the end of the pitman arm 82 of the steering gear. The steering gear 79 is carried on the steering column 83, the forward end of the column being pivoted in a bracket 84 on a body member 85 and its middle being adjustably supported by the dash.

From the above description and the accompanying drawings it will be seen that I have provided a suspension which attains the objects hereinbefore set forth and which is, in addition, economical to manufacture. While only one embodiment of the invention has been illustrated and described, numerous modifications can be made, and this application, as can be seen from the scope of the appended claims, covers such modifications as embody the inventive concept as well as covering several of the individual features of the suspension. In the claims, the word "body" is used to mean not only what is customarily described as a body, but also the frame or either the body or the frame. Other terms are also to be given the broadest meaning consistent with the novelty of the invention.

I claim:

1. A wheel suspension for an automobile comprising a fixed transverse tubular frame member, tubular means located within the frame member and extending substantially continuously throughout the length of said member, oscillatable wheel suupporting members fixed to the opposite ends of said tubular means, resilient rubber bushings interposed between said tubular means and frame member, and a transverse torsion bar extending through said tubular means and joining said wheel supporting members.

2. The combination of claim 1 in which said tubular means comprises a pair of alined tubes having their inner meeting ends rubber mounted within said tubular frame member.

3. The combination of claim 1 in which resilient rubber means is provided for supporting said torsion bar intermediate its ends within said tubular frame member.

4. In an automobile suspension, a transverse tube fixed to the body of the automobile, a pair of smaller transverse tubes extending in from the ends of the first transverse tube to a point near its center, load carrying arms secured to the outer ends of the smaller tubes, means to support the outer ends of the smaller tubes and to resiliently restrain their rotation with respect to the body, a torsion rod extending within the smaller tubes and having its ends fixed thereto, and vibration absorbing means in the center of the larger tube for supporting the inner ends of the smaller tube and the center of the torsion rod.

5. In a wheel suspension mechanism for a vehicle body, a pair of transversely spaced wheels, a pair of transversely alined rock shafts, oscillatable load supporting arms connecting said shafts and wheels, a fixed transverse member connecting opposite sides of the body, rubber spring devices interposed between said shafts and said member for resisting rotation thereof, a torsion bar connecting said shafts, and a resilient cushioning member connecting said bar and said fixed transverse member.

6. A wheel suspension for an automobile comprising a fixed transverse tubular frame member, tubular means extending through said member, oscillatable wheel supporting members fixed to the opposite ends of said tubular means, resilient rubber bushings interposed between the opposite ends of said tubular means and frame member, a transverse torsion bar extending through said tubular means and joining said wheel supporting members, and means for supporting said torsion bar intermediate its ends within said tubular frame member.

7. A wheel suspension for an automobile comprising a fixed transverse tubular frame member, tubular means extending through said member, oscillatable wheel supporting members fixed to the opposite ends of said tubular means, resilient rubber bushings interposed between the opposite ends of said tubular means and frame member, a transverse torsion bar extending through said tubular means and joining said wheel supporting members, and resilient rubber means for supporting said torsion bar intermediate its ends within said tubular frame member.

8. In a wheel suspension for a vehicle body, a pair of transversely spaced wheels, a pair of substantially parallel oscillatable load supporting arms connected to each wheel, a transverse rock shaft connected to each arm, a rubber spring device interposed between each shaft and the body for resisting rotation of the shaft, and a shock absorber unit operatively connected to one of the shafts of each pair of shafts.

9. In a wheel suspension for a vehicle body, a pair of transversely spaced wheels, a pair of substantially parallel oscillatable load supporting arms connected to each wheel, a transverse rock shaft connected to each arm, a rubber spring device interposed between each shaft and the body for resisting rotation of the shaft, a shock absorber unit operatively connected to one of the shafts of each pair of shafts, and cushioning means connecting said shock absorber unit to the body to permit limited relative movement of the unit with respect to the body.

10. In a wheel suspension for a vehicle body, a pair of transversely spaced wheels, a pair of substantially parallel oscillatable load supporting arms connected to each wheel, a transverse rock shaft connected to each arm, a shock absorber unit operatively connected to one shaft of each pair and yieldingly supported upon a fixed portion of the body for restricted bodily movement relatively thereto, and a rubber spring device connecting the other shaft of each pair with a fixed portion of the body for resisting rotation of said last named shaft.

11. In a wheel suspension for a vehicle body, a pair of transversely spaced wheels, a pair of substantially parallel oscillatable load supporting arms connected to each wheel, a transverse rock shaft connected to each arm, a shock absorber unit operatively connected to one shaft of each pair and yieldingly supported upon a fixed portion of the body for restricted bodily movement relatively thereto, and a rubber spring device connecting the other shaft of each pair with a fixed portion of the body for resisting rotation of said last named shaft, said spring device comprising inner and outer transverse concentric tubes having nested rubber bushings bonded thereto.

12. In a wheel suspension for a vehicle body, a pair of transversely spaced wheels, a pair of substantially parallel oscillatable load supporting arms connected to each wheel, a transverse rock shaft connected to each arm, a shock absorber unit operatively connected to one shaft of each pair and yieldingly supported upon a fixed portion of the body for restricted bodily movement relatively thereto, a rubber spring device connecting the other shaft of each pair with a fixed portion of the body for resisting rotation of said last named shaft, said spring device comprising inner and outer transverse concentric tubes having nested rubber bushings bonded thereto, and a cushioned torsion bar connecting said last named shafts.

13. In a wheel suspension for a vehicle body, a pair of transversely spaced wheels, a pair of substantially parallel oscillatable load supporting arms connected to each wheel, a transverse rock shaft connected to each arm, a shock absorber unit operatively connected to one shaft of each pair and supported by the body, and a rubber spring device connecting the other shaft of each pair with a fixed portion of the body for resisting rotation of said last named shaft.

JOHN TJAARDA.